US008855680B1

(12) United States Patent  (10) Patent No.: US 8,855,680 B1
Harris  (45) Date of Patent: Oct. 7, 2014

(54) COMPUTER SYSTEM WITH PROXIMITY BASED SELECTIONS

(75) Inventor: Scott C. Harris, Rancho Santa Fe, CA (US)

(73) Assignee: Harris Technology LLC, Rancho Santa Fe, CA (US)

( * ) Notice: Subject to any disclaimer, the term of this patent is extended or adjusted under 35 U.S.C. 154(b) by 94 days.

(21) Appl. No.: 13/158,390

(22) Filed: Jun. 11, 2011

(51) Int. Cl.
*H04W 24/00* (2009.01)
*H04M 3/00* (2006.01)
*H04M 1/66* (2006.01)
*G06F 15/173* (2006.01)

(52) U.S. Cl.
USPC ............... 455/456.3; 455/418; 455/456.1; 455/410; 709/224

(58) Field of Classification Search
USPC ....................................... 455/456.3
See application file for complete search history.

(56) References Cited

U.S. PATENT DOCUMENTS

| | | | |
|---|---|---|---|
| 2004/0039661 A1* | 2/2004 | Fuzell-Casey et al. | 705/27 |
| 2005/0219120 A1 | 10/2005 | Chang | |
| 2006/0014531 A1 | 1/2006 | Nam | |
| 2006/0053447 A1 | 3/2006 | Krzyzanowski | |
| 2006/0095331 A1 | 5/2006 | O'Malley | |
| 2007/0143499 A1 | 6/2007 | Chang | |
| 2007/0149214 A1 | 6/2007 | Walsh | |
| 2008/0082651 A1* | 4/2008 | Singh et al. | 709/224 |
| 2008/0195312 A1* | 8/2008 | Aaron et al. | 701/209 |
| 2009/0170492 A1* | 7/2009 | Lee | 455/418 |
| 2010/0332562 A1 | 12/2010 | Emigh | |
| 2011/0105150 A1* | 5/2011 | Moon et al. | 455/456.3 |

OTHER PUBLICATIONS

Apple IOS Jun. 5, 2011.

* cited by examiner

*Primary Examiner* — Timothy Pham
(74) *Attorney, Agent, or Firm* — Law Office of Scott C. Harris, Inc.

(57) ABSTRACT

A location sensitive to do list on a computer that has location detection capability. The to do list has operations that are ordered by location, and by time of day, and where the priority is increased or decreased based on time of day.

15 Claims, 5 Drawing Sheets

COMPUTER SYSTEM WITH PROXIMITY BASED SELECTIONS

BACKGROUND

Modern computers often have ways of determining their locations. The tablet computers such as the Apple iPad™, for example, uses "location services" for determining their specific location. This location may, in turn, be fed to certain programs, to use the current location as part of that program. For example, the location can be used to determine closest restaurants, local weather, and other information in the vicinity of the current location.

SUMMARY

The present application recognizes that many users do not fully use the capabilities of their computer, and describes automatically determining things that a user might want to do at a current time, including all the information that the computer knows, including location services.

An embodiment describes a context, location, and past-operation-sensitive to do list on a computer that has the ability to determine its location.

BRIEF DESCRIPTION OF THE DRAWINGS in the drawings.

DETAILED DESCRIPTION

Figure 1:
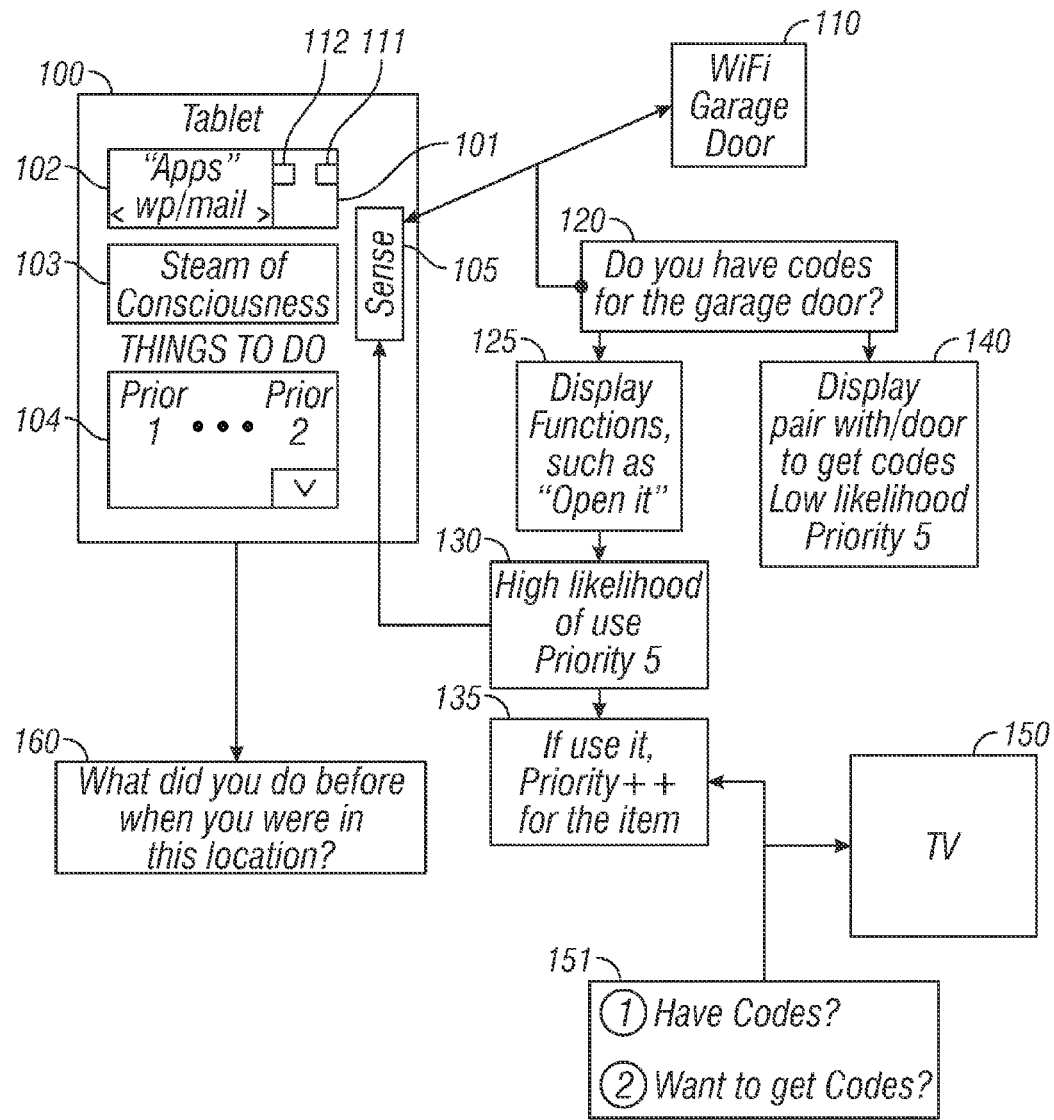
FIG. 1 shows a diagram of a computer and an overall flowchart of different things that can be done on the computer.

FIG. 1 illustrates an embodiment in the context of a tablet computer such as the Apple iPad. However, this system is described herein can be used on any such computer, so long as the computer has the ability and/or capability to determine its location. This may use systems which are similar to the iPad's location services, which finds information from Wi-Fi, cellular, global positioning, and/or landmarks which are capable of communicating with a computer.

FIG. 1 illustrates an embodiment. The computer 100, here a tablet, shows a number of items which are open on the screen of the computer. The computer 100 includes a conventional location sensing technique as described above.

The inventor has recognized that even though these modern computers can have very powerful features and capabilities, users may not even know about all the powerful features that the user can do.

The screen shows different display sections, that show different things that can be done. These "things" are operations that are carried out on the computer, including any of the computer based operations described herein. The section 102 shows the different "applications" or "apps" that can be carried out on the tablet. This may include core computer operations such as things like mail, or word processing, as well as other specialized applications, such as social networking settings, restaurant reservations or other local items, or other applications.

A special section shown as 104 provides a things to do list, which is a prioritized, location sensitive, list of things that a user can do based on their current location and a current time. This is described in further detail herein.

It is contemplated that the screen of the computer is not large enough to display icons or commands for all the different things that a user could do at any given time. For each of these items, there may be multiple pages, and the user can scroll between the multiple pages. However, the lists, and the pages Accordingly the lists are prioritized according to a likelihood that the user would want to select the items. In this way, the user is more likely to find things they want to select on the first page of where they look.

According to one embodiment, the computer shows multiple pages of applications, each page having a certain number of applications thereon. The pages are arranged such that the most likely application that a user will select is further to the front, that is, more likely to be selected first.

The pages might each have multiple sections, as shown in FIG. 1, and those multiple sections might each be arranged in this way.

A stream of consciousness section 103 allows the user to enter items that they want to carry out in any natural language form. This is described in further detail herein also.

The apps 102 also include a special location sensitive portion 101.

In addition, the computer 100 includes an item sensor 105 that detects other items with which the computer can interact. For example, if in FIG. 1, the sensor 105 is shown interacting with a Wi-Fi enabled garage door.

Upon detecting the Wi-Fi enabled garage door, this becomes one possibility of the things the computer can do (interact with the garage door, eg., to open the garage door. One aspect of the present application is to determine things to do that based on the items that are found within interacting distance of the computer itself.

For a garage door, the user would conventionally need certain codes to operate that garage door. When the computer finds a controllable garage door that is within distance of the computer, it does not mean that that garage door can be controlled by the computer. For example, this might find garage doors as you drive down the street with the computer turned on.

Accordingly, one of the actions at 120 determines if there are stored codes for the specific garage door. If so, then the answer is yes, and the location sensitive to do operation may display functions which are available at 125.

At 130, the computer determines the likelihood that this function will be used. The likelihood of use may be determined from past actions of the specific user as one parameter. The action itself may also have an associated priority which may be used to set the likelihood of use.

130 shows the likelihood of use for this garage door being priority 2. This may be 2/5, that is the second from the highest priority. Priority 1 actions will be displayed as higher priority actions and so on earlier or higher priority pages than this priority 2 action. Priority 3-5 actions will be lower priority actions, thus displayed on lower priority pages. The priority represents a likelihood of this particular action being selected by a user.

Other to do actions may require a download, e.g., to download material that is available for the computer, such as an application to take some operation, or to download a video or other multimedia. Any of these items can be returned as part of the possible to do items.

Whenever a user uses one of the functions, as shown at 135, the priority is increased for that item that was used. Therefore, for example, the use of the garage door may increase the priority for the garage door. If the garage door has been used once detected, then this may increase the priority, so that the next time, the garage door is seen, it has priority 2+. Lack of use of the item when available, conversely, may cause the priority to decrease. The decrease of priority for non-use may occur slower than the increase of priority for. For example, when the item is used, the priority may increase by a first amount x; while when the item is not used, the priority may decrease by some small percentage of x, for example x/25 until reaching the default amount (the amount that is the default for the item,) after which the priority percentage might decrease each time it is not used by x/100. This takes into account that a user might not always use an item, but when a user does use that item, even some of the time, it signifies that the user might want to use it again.

Another aspect may increase the likelihood for time of day; for example, the system detects the time of day when the user has requested the garage door to be opened. The user may request the garage door to be opened at 8 AM, and therefore at the time of day of 8 AM or around 8 AM, the priority associated with opening the garage door might be increased. However, the user might never request the garage door to be opened at 3 AM, and hence the priority of the garage door being opened at 3 AM can be much lower.

At 120, for any device for which the user does not have codes, one possibility might be up to obtain a pairing to obtain codes for that device. 140 shows a display of pairing with the door to get codes, with a low likelihood, here priority 5.

Another detection by 105 is that of a television shown as 150 in FIG. 1. This may be an Internet aware television, or may simply be a Wi-Fi detection that a television is available, when one of the control possibilities of the computer is the control of such a television. Again, 151 shows the generic things that a user might be able to do, by detecting whether it has the codes for the TV, if so displaying them at a priority, and if not, asking the user if they want to obtain a code, with the wanting to obtain the code being at a different priority.

Another detection may detect for example a television or video screen to which it can connect via a wireless video protocol such as wireless HDMI. Detecting this video protocol capability may cause the list to indicate stored or live video items to be displayed on the television screen.

In a similar way, the computer 100 may detect other items in the vicinity, by detecting either a direct communication with those items, or detecting those items in some other way. Both the items which are detected, as well as other possible things to do in the specific location, are displayed on the things to do page 104. These constitute location-sensitive things one can do, and that are based on the user's location.

Other than determining items which are within the vicinity, the things to do may also take into account at 160, a determination of what the user did before when they were in this location, either at time, or at similar times of day. For example, when the user is detected to be home, they may have things that they usually do when at home, check e-mail, read the news, get on a specific website. Any time the user does something, that thing they do is stored, along with a priority based on when this was done, that is how long ago this was done, the time of day that it was done, and other things about the user's previous action. The priority is set based on, items noted above, how often it has been used how long it has been since it was used, similarity of the current time of day to the time of day when it was last used, and whether it was used in the same location you are currently in.

The system may start out with some defaults, which are guesses at what all users might want to do at a certain time of day in a certain place. The default could include read the news, check prices, or the like. According to one embodiment, different applications may pay for advertising, which causes them to be among the default applications. However, the defaults change when the users take certain actions. For example, when a user who was home turns on their computer at 7:30 AM, they may then do certain things, such as check e-mail, read the wall street journal, check traffic. When the user does this at home at 730, each of these things are added to the computer memory, along with the time, the location, and a priority associated with those things.

The next morning, when the user is at home, and it is 730, the location sensitive to do list 104 may show as the highest priorities, checking e-mail, and reading the wall street journal, and checking the traffic report. If the user does these things again, it increases the priority even further. When the user does not do these things, it may decrease the priority, either slightly, or a lot. However, if the user does something else, doing that other thing may increase the priority of that other thing, thus putting it higher up in the location sensitive pages the next time around.

Now, if the user is found to be at work and turned on the same computer at 730, the computer may display different things the user might want to do at work. These may be based on the things that the user has previously done in the work location for example at 730. Initially, before the system learns the kinds of things that might be highest priority, there may be defaults which are based on what generic users are presumed to have done, or things that this user has done at a similar time in other locations, or any other kind of gas at things that might be done. If the user checks stocks at work, but checks traffic at home at 730, then the location-sensitive to do list may be show checking stocks as the highest priority if the user is at work at 730, but may show checking traffic as the highest priority if the user is at home at 730.

Analogously, the system may show different entertainment items such as videos or new music as possible downloads when the user is at home, but might not show the same downloads when the user is at work. The system can detect that a television screen which accepts streaming (for example by wireless HDMI) is within vicinity, and automatically provide some of the highest rated video downloads when the video screen is within vicinity.

As another download function, the system may detect the user carrying out some action, and automatically show a download of an application which can assist the user in carrying out that action.

The different features may be stored as a vector, that has parameters indicating the location of the operation, time of day of the operation, and time since the operation was last carried out, as well as other things that indicate whether the user might want to do these things at this time or at some other time. A least mean squares detection between the current time, and previous times may be used to detect which should be the highest priority.

In addition, different providers may pay a fee analogous to an advertising fee that causes the priority of their application to increase at a higher rate than other priorities. For example, the Wall St journal may pay an advertising fee to cause that application to increase in priority disproportionately with other application priorities. According to one embodiment, this can be a special fee. According to another embodiment, any application that pays for any advertising has their priority increased disproportionately to those that do not pay for advertising.

The stream of consciousness entry at 103 allows a user to enter, in any kind of form, information about what they might want to do. By entering any kind of information, the computer can recognize things that are related to those things they might want to do may appear in the location-sensitive to do list. A stream of consciousness instruction can be entered either directly into the stream of consciousness section 103, or when appropriately enabled on the computer, can be entered as an instruction to a different website. The SOC-enabled websites are shown in a separate section 101 in FIG. 1.

For example, user may enable the ability for things entered into the Facebook website 111 to become part of the stream of consciousness detection. In a similar way, the user can enter things into other websites, here shown as "open table" 112 that become part of the stream of consciousness detection. Websites which are in the special stream of consciousness section shown as 101 may be automatically analyzed to determine stream of consciousness information, and to take actions based on that information, as described herein.

Figure 2:
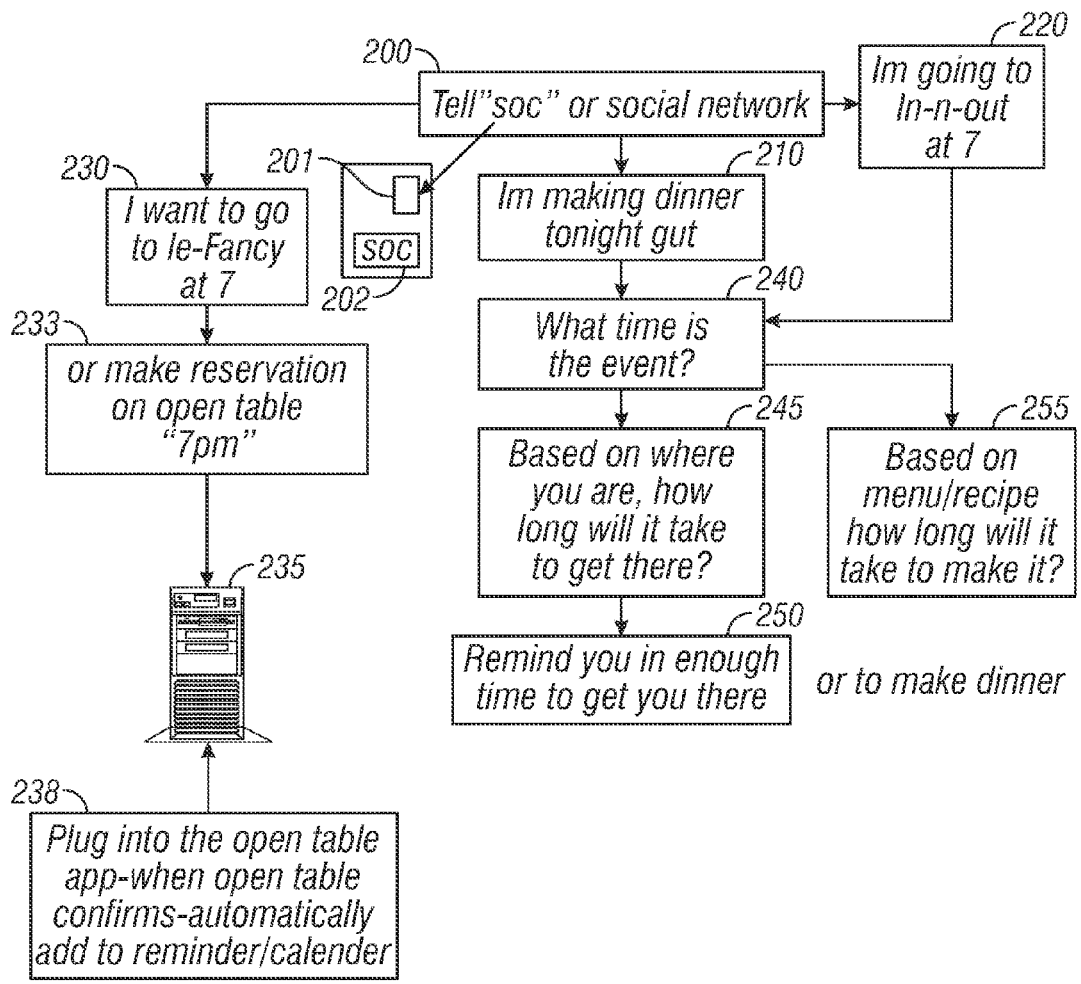
FIG. 2 shows a flowchart of the operation of the stream of consciousness embodiment when used for a restaurant.

A flowchart of the operation is described with reference to FIG. 2. At 200, the user enters information to tell the stream of consciousness ("SOC"), or to tell the social network, (or some other SOC enabled site) to take some action. Here, the example is that either the SOC site shown as 201 or the SOC itself shown as 202 is being told by the user "I'm making dinner tonight" at 210. The system may use natural language recognition, and/or identification of key words to determine how to process this information. Another example at 220 is a user telling either the stream of consciousness or an SOC site "I'm going to in-n-out at 7 PM tonight". Another example shown as 230 is a user telling either the stream of consciousness or the website that you want to go to the restaurant called "Le_Fancy" tonight e.g. at seven o'clock.

Taking the latter example first, at 230, the request for a restaurant reservation can be entered into the stream of consciousness, or into Facebook or into the Opentable site. However entered, the computer uses a language recognition system to determine that it has been requested to make a reservation at a place called Le_Fancy at 7 PM this evening. This determination is shown as 233.

This may plug into an existing application for a reservation website, such as open table at 235. Now, the system determines if it received a reservation. When it does, it confirms to the user by displaying a message that they have a reservation at the desired place, and adds to the reminder/calendar at 238. The system may also automatically send reminders and/or invitations to other people if the stream of consciousness or some other item tells it who to send the invitations to.

For example, if it says I want to go to Le_Fancy tonight with Larry, this may automatically send an invitation to Larry. The invitation can be by e-mail, or can be on the SOC enabled social network. For this and other items, for the making dinner tonight (210) or the going to a fast food restaurant (220), the system determines the time of the event at 240.

At 245, the system determines based on where you are, how long will it take you to get there, to the in and out in the example of 220. For example, the closest in and out may be determined to be 30 min. away from your current location, and so the system determines it will take you 30 min. to get there. At 250, then the system dockets a reminder to remind you in enough time to get there. For example, at 630, the computer might then automatically provide you with a reminder that you need to leave at 630 in order to get to in out by 7.

The SOC system may automatically detect and post on the social network (e.g. Facebook) that you're going to in and out at 7. The SOC system will also request the requested people to meet at In n Out at 7.

The SOC system may automatically detect the operation of getting a reservation on the one website (e.g., open table) and post on the social network (e.g. Facebook) that you're going to Le_Fancy at seven.

For the example of making dinner tonight at 210, flow again passes to 240 which indicate which determines what time is the event. In this example, the user has not told the system what time the event is occurring. The system, therefore, may postulate a time based on previous dinner times, or it may ask the user.

If the user has indicated what they want to make for dinner (or for lunch or for some other meal), the system at 255 may look up a menu or recipe and based on that menu or recipe how long will it take to make it, providing a reminder at an appropriate time before having made that. If the user is not home at that time, based on the location, the reminder may also allot a time to get to their home location. More details in the stream of consciousness may provide more information about what the user wants to do.

Figure 3:
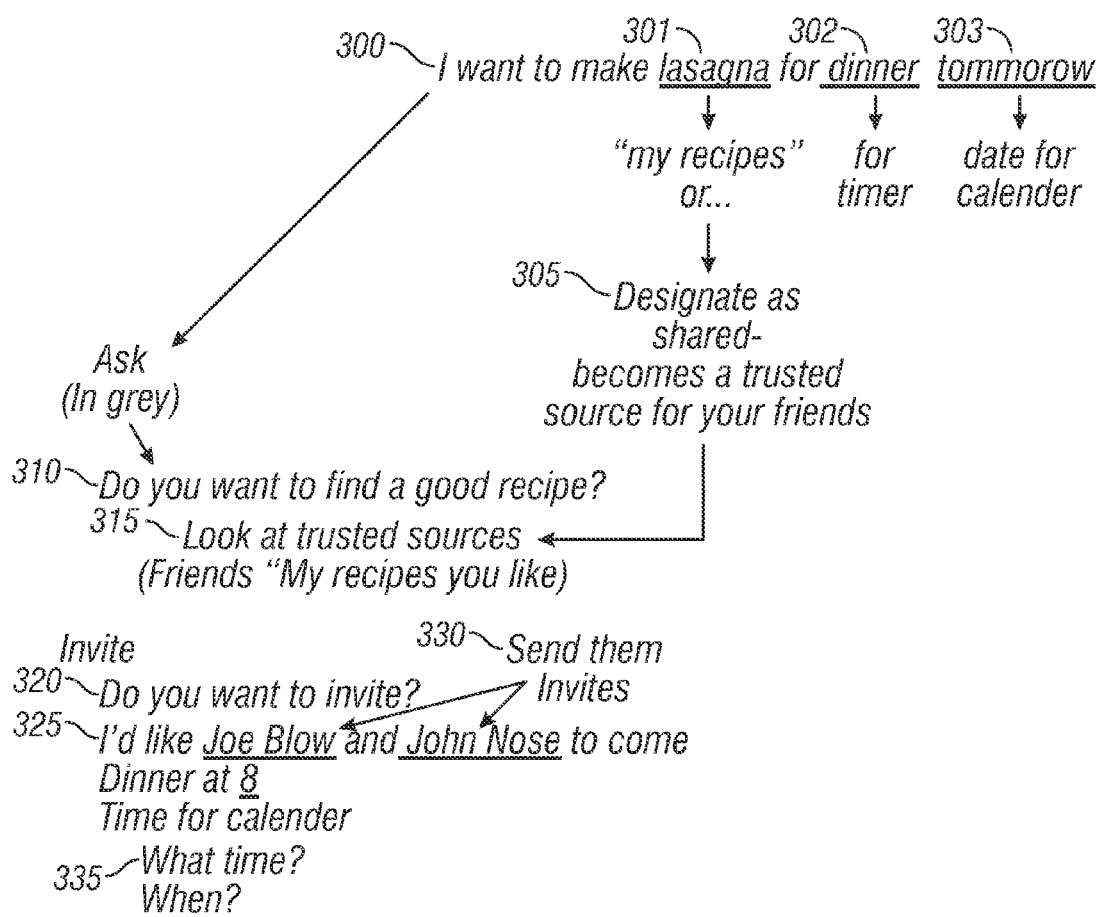
FIG. 3 shows an operation of parsing the different items entered into the stream of consciousness.

FIG. 3, for example, shows the example at 300 of the user saying "I want to make lasagna for dinner tomorrow night". When the system parses this out, it finds a number of things, lasagna at 301, dinner at 302, and tomorrow at 303. The dinner is used to set the timer, which may be a location sensitive timer of the type described previously that provides the user with a reminder based on the user's current detected location. The date at 303 of "tomorrow" is used for the calendar. Now, the word lasagna is used to find a recipe. The user may look this up in a store of recipes such as "my recipes", or may add to the different to do lists some way of finding the recipe. For example, the location sensitive to do list may ask a few different questions at this point, such as 'do you want to look this up in my recipes'? Or, at 305, it may ask, do you want to look this up in any of your trusted sources for recipes which may include websites which you belong to, or friends' shared repositories of recipes.

At 310, one of the questions which may be asked in the location sensitive to do list is 'do you want to find a good recipe for lasagna'. This may start by looking at the trusted sources at 315 such as friends' recipes or sites for recipes. It may also look at any other information systems. As in above embodiments, the information systems in this are sorted according to the user's previous actions, how long since they have used this same kind of system, and what do they do the last time they wanted recipe. At 320, one of the questions provided in the location sensitive things to do list is "do you want to invite anybody"?. The user can tell the system in the stream of consciousness or simply answer this question, such as with I'd like to invite Joe blow and John Nose to come at 325. The system then can send these people invites either by e-mail or via social network. Similar questions may be what time at 335, and when. All of these can be added to the calendar.

Figure 4:
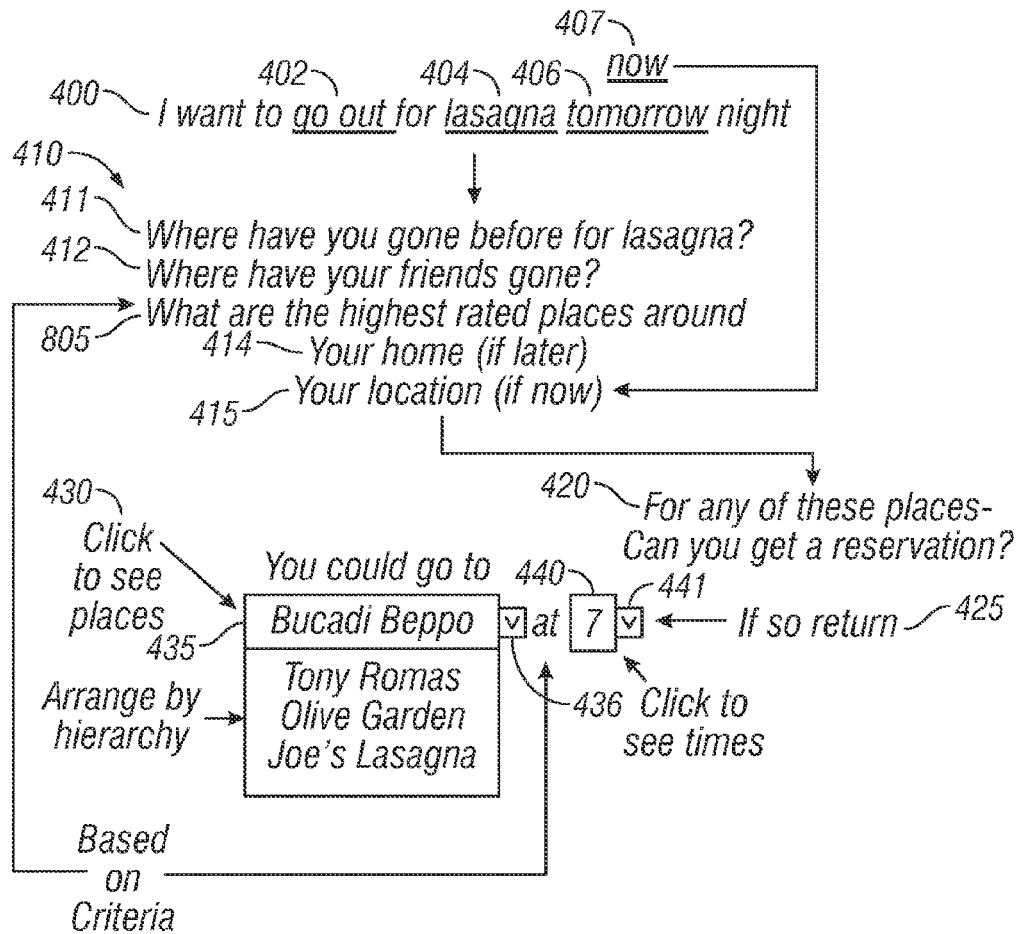
FIG. 4 shows an alternative parsing operation which provides the ability to provide a user with different options based on the stream of consciousness.

FIG. 4 shows another example, where a sentence 400 can be entered into either the stream of consciousness or an SOC enabled site saying I want to go out for lasagna tomorrow night. The keywords found in this may include go out 402, lasagna 404, tomorrow night 406. An alternative might be now at 407.

At this point, the computer operation may make determinations as shown at generically in 410 such as 'where have you gone before for lasagna' at 411 'where have your friends gone for lasagna' at 412. The detection of where friends have gone may be available from, for example, the social networking website or from sharing preferences with friends.

413 may determine what are the highest rated places around you. This may itself have different options: for example, the system may look for highest rated places around your home at 414 if the time is later, or around the location where you usually are at that time when the time is later. 415 shows the system investigating around your current location at 415 if the time is now at 407.

420 may determine for any of these places, can you get a reservation? If so, at 425, the system may return a display screen such as shown in 430. This may include a drop-down list 435 of different places that the user could go at the desired times. For example, the system may say you could go to "Buca di Beppo" but other places available via the drop-down arrow 436. The menus on the list at 435 may be sorted by location, popularity, and/or advertising payments. Clicking the arrow 436 may show the other places, here shown as Tony Romo's, Olive Garden, or Joe's lasagna. These may be arranged by hierarchy based on the ratings as described above.

For each place that the user chooses, there may be the available times shown as 440, where the most desirable time might be shown first, but by clicking the arrow 441, the user may see other times. The user can also enter other times into the box 440, which causes a return of the different options for that different time.

Figure 5:
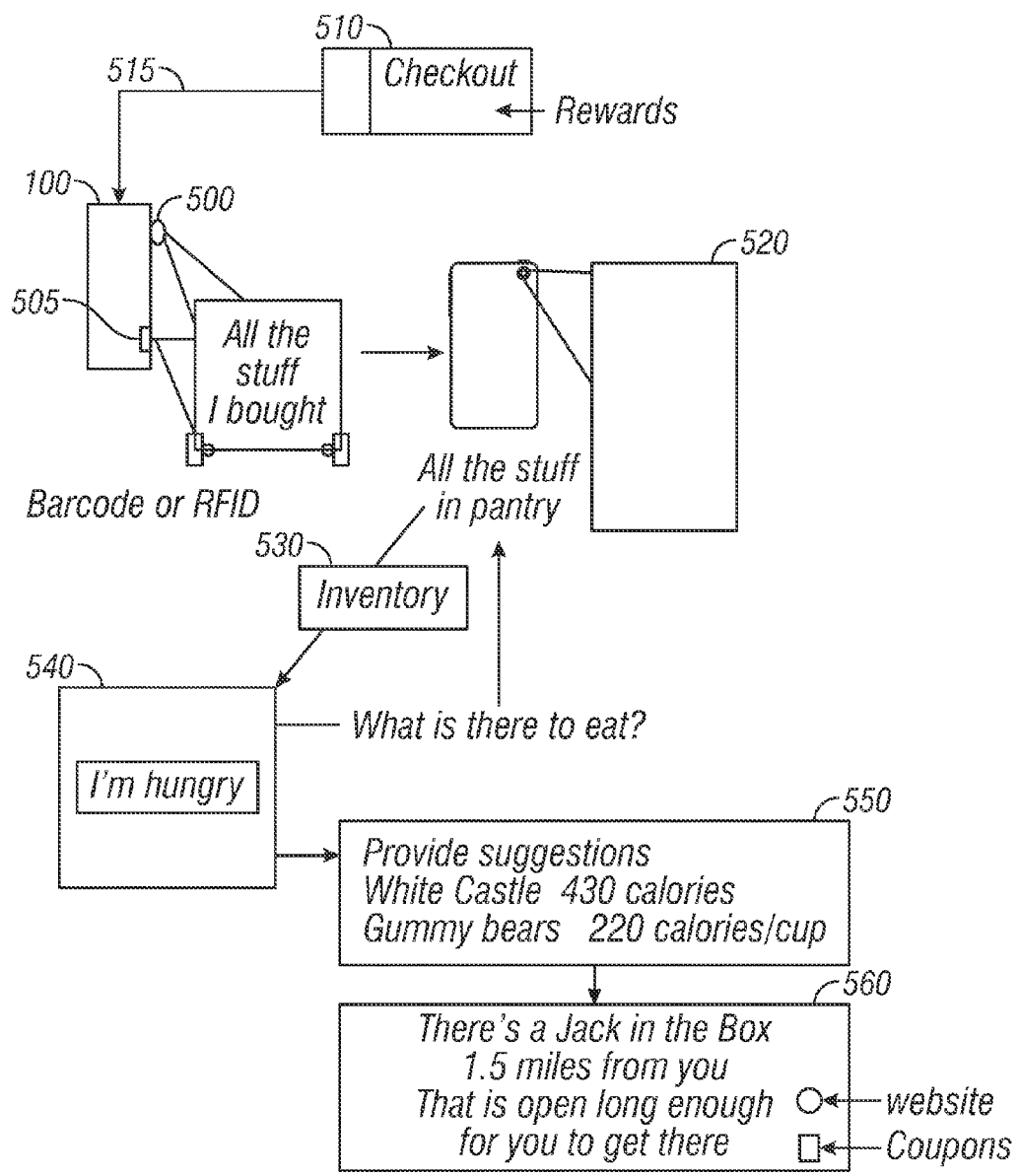
FIG. 5 shows an embodiment used for pantry management.

Another embodiment shown in FIG. 5, in which the system attempts to keep track of the different items which the user currently has and tries to help the user in appropriately using these items. An example in FIG. 5 is shown for pantry items, where the system will operate to help the user keep track of the pantry items they buy. In this embodiment, the computer 100 has a camera 500 or an RFID reader 505. This is shown scanning all the items that user is buying in their shopping cart. As an alternative, a tablet aware system may be used at checkout where the checkout keeps track of all the items the user buys, and the user enters for example their rewards number such as their phone number shown is 510. Part of that rewards number, indicates information indicative of the user's individual computer. When the transaction is finished, the system automatically sends for example by e-mail, shown is 515, information of all the different items that the user has purchased. This may be done for example by using the barcodes to provide information about these items, and to send these items to the computer 100, where they are stored. The user may use the same technique to keep track via barcode or RFID of all the items in their food storage place such as their pantry. The user may tell the system when they use certain items by entering I just used a can of tomatoes into SOC, for example. In the recipe embodiment, the system may check the user's stock of items, and indicates that these items are or are not available, and after making the recipe, may reduce the stock in the pantry appropriately. As another embodiment, the program may simply assume after a certain amount of time that the items are no longer usable. For example when the user buys lettuce, that lettuce may not be good beyond a week. However, canned goods may be good for three months, and other items may be good for two weeks to two months depending on whether they are frozen or refrigerated, or other.

In one embodiment, the user may receive a reminder a day or two days before something spoils, so for example after shopping at the grocery store, the user may receive daily reminders that certain items are about to go bad. The user may be able to check boxes next to those items indicating that they don't want further reminders about those items, for example if they've already use them or don't plan to use them at all.

However obtained, at 530, the system has stored in its memory an inventory of food which has been purchased. Now, the user can enter into the stream of consciousness shown as 540 that I'm hungry, and the system may then determine different things to eat as possible things to do. One of the possibilities is if the user is near a restaurant, it can suggest those restaurants e.g., good restaurants for fast food. 560, for example shows the system indicating that there is a Jack-in-the-Box 1½ miles from you. It may also be useful to know if the restaurant is open, and 560 may also indicate that the Jack-in-the-Box is open long enough for you to get there if you leave now; or is open for another 4 hours; or that they will deliver to your current location, or other information.

In one embodiment, this may also link to the specific restaurant website to make sure that there are no unexpected closures, or to obtain specials such as coupons which may be returned as part of the response.

550 may also provide suggestions of what is currently available at home to eat, such as frozen White Castle burgers, along with their calorie count shown as 430 cal, or gummy bears 220 cal per cup.

Other applications are possible. Since the system knows where you are, and what you have done before, it determines what are the most likely things you are going to do by parsing your requests. By telling the system something that you want to do, the computer out the most likely things that you might want to do. Moreover, since the system may interface with websites and/or applications, in figure outs things from that, and generates both calendar entries and reminders based on that information.

The computer, as described above, may be any kind of computer, and may for example be a tablet which includes a touch screen interface allowing entry of data, that is processed by a microprocessor and/or microcontroller, stored in memory, and used to input and output information. The computer may have a touch screen interface on its front screen. The computer has a location determining part, e.g., a GPS chip or chipset, or the ability to obtain location from landmarks such as cell towers, e.g., using a location service, or any other technique of determining its location. The computer may also have wireless interfaces such as Wi-Fi, wireless HDMI, Bluetooth, RFID, wireless USB as well as any other wireless interface. The computer may also be a cell phone, in which case an RF interface may be provided. There may also be a wired ports such as wired ethernet, or any other wired interface.

Another computer of another embodiment may have reduced hardware, and carry out its computing operation using cloud type computing resources.

The above has described using the system to obtain access to resources of a computer, but alternatively this can provide access to any machine such as a remote control or other.

Moreover, the above is described only certain applications, but it should be understood that other applications can be used in a similar way. While this is described food, it can be used to carry out things other than food, such as what kind of activities are going on in my location right now, where can I buy shoe polish, where can I go now, I'm bored. One specific application may simply use the I'm bored as a generalized request for different things to do based on time/date and location where the item is specifically located in based on things that the user has done in the past.

This can also be used with the techniques described in provisional application No. 61/445,184, filed Feb. 22, 2011, and entitled "Automatic Localton Messages in a Social Network", to determine things that the user is currently doing and update the preferences more exactly.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client.

The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodi-

What is claimed is:

1. A computer, comprising:
a processor;
memory, used along with said processor for processing information;
a user interface, where said user interface includes at least a display, and an ability to accept commands from a user;
a computer program operating on said computer and using said processor, memory, and user interface, said computer program operating to determine a location of said computer, and said computer program also including a plurality of different operations that said computer can carry out, and said computer programmed to provide a list of operations that can be done on the computer, said list of operations that is provided by said program being based on said determined location and said list of operations provided by said program including a first list when said computer is determined to be located at a first location and including a second list which is different than said first list when said computer is determined to be located at a second location that is different than said first location, each of said lists including multiple items that can be carried out, and said first list including control of a remote device based on said first location, and said second list not including control of said remote device based on said second location,
wherein said list is presented in an order that is based on a current location where said order is a first order for said first location and is a second order for said second location,
and wherein said computer stores information indicative of a history of operations that have been done in the past on the computer, along with times of day when the user has carried out specific operations, and locations where the computer was when it carried out said specific operations, and wherein said order is based on both said times of day and said specific locations, such that a first of said specific operations which was previously done at a first time and location which is similar to a current time and location is presented higher in order in the list relative to a second of said specific operations which was not previously done at said first time and location that is similar to said current time and location.

2. The computer as in claim 1, wherein said computer stores a priority level for each of a plurality of said operations and orders said list based on said priority level with higher priority level items being displayed higher in the list than lower priority level items.

3. The computer as in claim 2, wherein said computer operates to increase a priority level for certain time and location when said operation is carried out at that time and location, and to decrease said priority level for said time and location when said operation is not carried out at said time and location.

4. The A computer as in claim 3, further comprising stored information indicative of advertising for at least one of said operations, and wherein detecting advertising for said one of said operations changes at least one of a rate of increase or decrease of said priority level.

5. The computer as in claim 1, wherein one of said different operations includes download of a file that can be used on the computer, where said download of said file is displayed in an order in said list that is based on a current time and a current location.

6. The computer as in claim 1, wherein said location includes a proximity to said remote device which can be controlled by the computer, and said list of operations includes controlling the remote device only when in proximity to the remote device.

7. A computer, comprising:
a processor;
memory, used along with said processor for processing information;
a user interface, where said user interface includes at least a display, and an ability to accept commands from a user;
a computer program operating on said computer and using said processor, memory, and user interface, said computer program operating to determine a current time, and said computer also including a plurality of different operations that said computer can carry out, and said computer programmed to provide a list of operations that can be carried out on the computer,
said list of operations, for a first universe of possible operations that can be carried out on the computer, being based on said current time and a current location, and including a first list for a first time and location and including a second list which is different than said first list for a second time and location that is different than said first time and location,
each of said lists including multiple items that can be carried out, and said first list including control of a remote device based on said current location, and said second list not including control of said remote device, wherein said list is presented in an order that is based on said current location, where said order is a first order for a first location and is a second order for a second location, and wherein said times are times of day, and said computer stores information indicative of a history of operations that have been done in the past on the computer, along with times of day when the user has carried out specific operations, and locations where the computer was when it carried out said specific operations, and wherein said order is based on both said times of day and said specific locations, such that a first of said specific operations which was previously done at a first time and location which is similar to a current time and location is presented higher in order in the list relative to a second of said specific operations which was not previously done at said first time and location that is similar to said current time and location.

8. The computer as in claim 7, wherein said computer stores a priority level for each of a plurality of said operations and orders said list based on said priority level with higher priority level items being displayed higher in the list than lower priority level items.

9. The computer as in claim 8, wherein said computer operates to increase a priority level for a certain time and location when said operation is carried out at that time and location, and to decrease said priority level for said time and location when said operation is not carried out at said time and location.

10. The computer as in claim 9, further comprising stored information indicative of advertising for at least one of said operations, and wherein detecting advertising for said one of said operations changes at least one of a rate of increase or decrease of said priority level.

11. The computer as in claim 7, wherein one of said different operations includes download of a file that can be used on the computer, where said download of said file is displayed in an order in said list that is based on a current time and a current location.

12. A method of operating a computer, comprising:
detecting a location of the computer as a determined location;

using the computer for displaying a list of operations that can be taken on the computer;

said list of operations being based on said determined location and including a first list that is automatically displayed when the computer is determined to be located at a first determined location and including a second list which is different than said first list that is automatically displayed when the computer is determined to be located at a second determined location that is different than said first location, each of said lists including multiple items that can be carried out, and said first list including control of a remote device based on said first location, and said second list not including control of said remote device based on said second location, wherein said list is presented in an order that is based on a current location where said order is a first order for said first location and is a second order for said second location, and wherein said computer stores information indicative of a history of operations that have been done in the past on the computer, along with times of day when a user has carried out specific operations, and locations where the computer was when it carried out said specific operations, and wherein said order is based on both said times of day and said specific locations, such that a first of said specific operations which was previously done at a first time and location which is similar to a current time and location is presented higher in order in the list relative to a second of said specific operations which was not previously done at said first time and location that is similar to said current time and location.

13. The method as in claim 12, wherein said computer operates to increase a priority level for certain time and location when said operation is carried out at that time and location, and to decrease said priority level for said time and location when said operation is not carried out at said time and location.

14. The method as in claim 12, wherein said computer operates to increase a priority level for a certain location when said operation is carried out at that location, and to decrease said priority level for said location when said operation is not carried out at said location.

15. The method as in claim 12, wherein said location includes a proximity to said remote device which can be controlled by the computer, and said list of operations includes controlling the remote device only when in proximity to the remote device.

* * * * *